May 15, 1962 R. W. BUELL ET AL 3,034,813
THROTTLE CONTROL LINKAGE ADJUSTMENT
Original Filed March 12, 1956
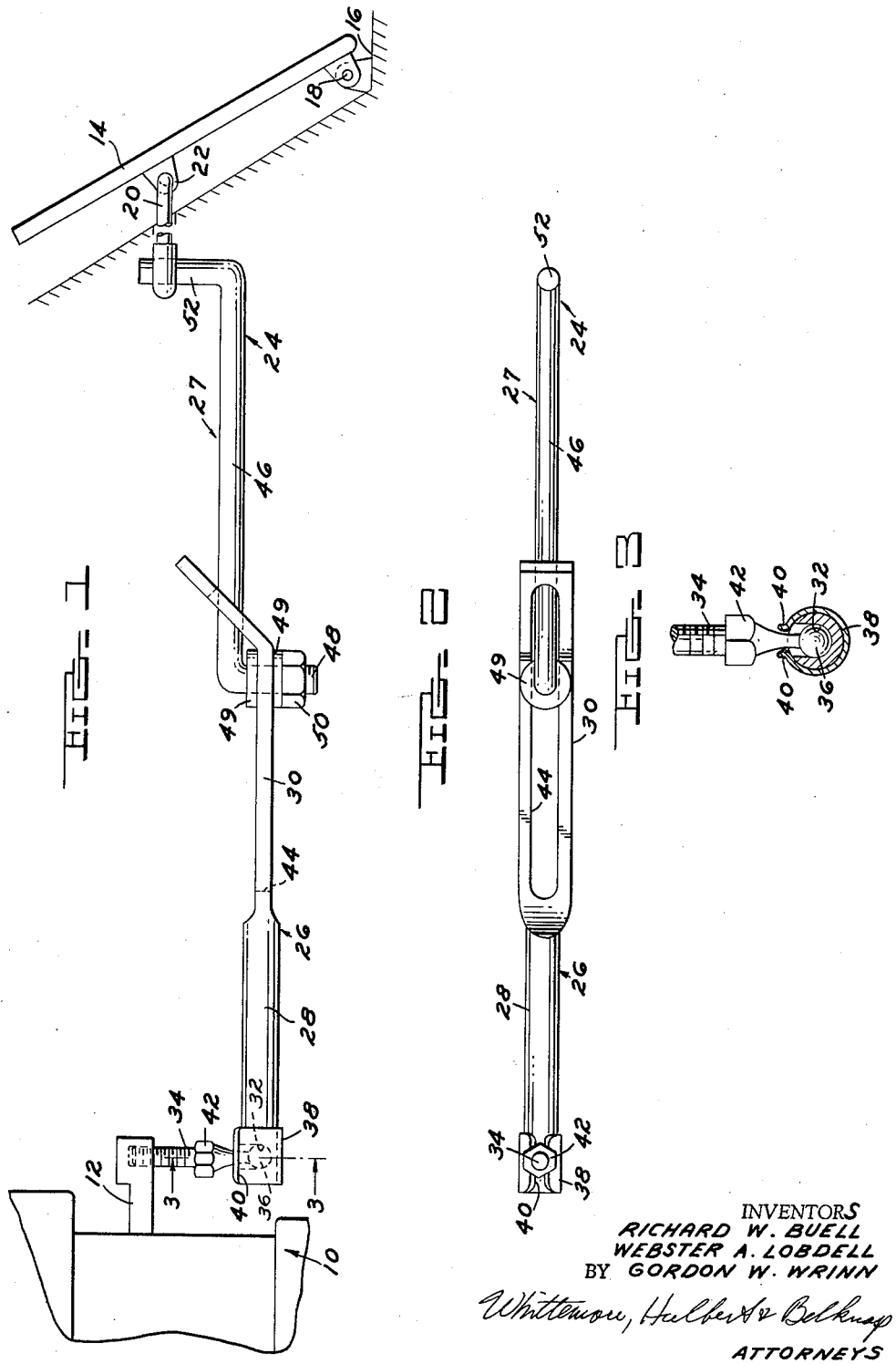
INVENTORS
RICHARD W. BUELL
WEBSTER A. LOBDELL
BY GORDON W. WRINN
*Whittemore, Hulbert & Belknap*
ATTORNEYS

United States Patent Office 3,034,813
Patented May 15, 1962

3,034,813
THROTTLE CONTROL LINKAGE ADJUSTMENT
Richard W. Buell, Webster A. Lobdell, and Gordon W. Wrinn, Detroit, Mich., assignors to Claude Sintz, Inc., Detroit, Mich., a corporation of Michigan
Original application Mar. 12, 1956, Ser. No. 570,732, now Patent No. 2,839,949, dated June 24, 1958. Divided and this application Feb. 3, 1958, Ser. No. 712,914
1 Claim. (Cl. 287—90)

This invention relates to a fuel control system and refers more particularly to a throttle control linkage adjustment therefor.

The flow of fuel-air mixture in a carburetor is ordinarily controlled by a manually operated throttle or accelerator member which is connected to the operating member or control arm of the carburetor by suitable linkage. One object of this invention is to provide a novel releasable ball and socket connection between the linkage and one of the members.

Other objects of the invention will become apparent as the following description proceeds especially when considered in conjunction with the accompanying drawing, wherein:

FIGURE 1 is a side elevation view of a fuel control system including the adjustable linkage embodying the features of the present invention.

FIGURE 2 is a top plan view of the linkage shown in FIGURE 1.

FIGURE 3 is a sectional view taken along the line 3—3 on FIGURE 1.

Referring now more particularly to the drawing, a carburetor is indicated generally at 10 having an operating lever or control arm 12 which is movable to the right and to the left as viewed in FIGURE 1 to vary the flow of fuel-air mixture in the carburetor. The accelerator pedal or throttle member 14 is in the form of an elongated foot operated pedal which is pivotally supported on the floor 16 of a motor vehicle, the pivotal connection being indicated at 18. A link 20 has one end pivotally connected to an ear 22 carried by the pedal 14 and the other end of the link 20 is secured to an end of the linkage 24. The opposite end of the linkage 24 is connected to the control member 12.

Referring now in detail to the linkage 24, such linkage comprises the elongated elements or rods 26 and 27. The rod 26 has an outer portion 28 of uniform circular cross-section and has an inner portion 30 which is flattened to the narrow configuration illustrated. The outer end of portion 28 has a socket 32 which extends into the side thereof. This socket has a hemispherical bottom which merges into a cylindrical portion which extends to the outer surface of portion 28. A threaded shank 34 has its upper end threaded into the tapped recess in the under side of the operating lever 12 and has a ball 36 at the lower end which is disposed in the socket 32 and which has a radius approximately equal to the radius of curvature of the hemispherical bottom surface of the socket. The radius of the cylindrical portion of the socket is the same as the hemispherical bottom surface so that the ball may be freely inserted into the socket and readily removed therefrom. When retained in the socket, the ball has a limited universal movement.

In order to retain the ball in the socket, a flexible resilient U-shaped sheet metal retaining sleeve or member 38 embraces the outer end of the rod 26. The free ends of the retaining member 38 are flared slightly as indicated at 40 and the flared portions bulge outwardly in the region of the socket. The bulged portions of the flared ends partially overlap the socket to retain the ball therein and to enable the ball to be inserted into and removed from the socket with a force sufficient to expand the retainer member. It will be noted that the shank 34 has an intermediate enlarged portion of polygonal cross-section indicated at 42. By the application of a suitable wrench, the shank may be rotated to thread its upper end into or out of the control lever 12 without removing the ball from the socket.

The inner end portion 30 of rod 26 has a slot 44 therein which is elongated in the direction of length of the rod. The inner end portion 30 is bent at a substantial angle along a line intermediate the ends of the slot and extending across the slot.

The other element or rod 27 is of uniform circular cross-section throughout its length and has a diameter less than the width of the slot to enable it to be inserted in the slot. The intermediate portion 46 of rod 27 extends into the slot in the region inwardly beyond the bend, and the inner extremity 48 of rod 28 is turned downwardly at right angles to the intermediate portion 46 and extends through the slot at a point outwardly beyond the bend. Washers 49 are loosely sleeved over the extremity 48 of rod 28 on opposite sides of the slotted inner end portion 30 and a nut 50 is threaded on the end of the extremity. The intermediate portion 46 bears against the inner end of slot 44.

The outer end extremity 52 of rod 27 is bent upwardly at right angles to the intermediate portion 46, and in the plane of the inner extremity 48. The outer end extremity 52 is connected to the link 20 in any suitable manner.

It will be evident from the foregoing that the length of the linkage 24 may be readily varied by merely loosening the nut 50 to permit the extremity 48 to slide longitudinally in the portion of the slot outwardly of the bend. When the selected position of adjustment has been obtained, the nut 50 is tightened to press the washers 49 tightly together on opposite sides of the slotted portion 30. The intermediate portion 46 of the rod, of course, provides an abutment for the opposite side of the upper washer.

In accordance with this construction, the linkage is rigid in any position of adjustment, that is, any tendency for the rods 26 and 27 to turn or pivot relative to each other is opposed.

This application is a Division of our copending application Serial No. 570,732, filed March 12, 1956, now Patent No. 2,839,949.

What we claim as our invention is:

A releasable ball and socket connection comprising an elongated element having a substantially smooth cylindrical exterior surface at one end thereof, a transverse recess at said one end of said elongated element forming a cylindrical socket through the smooth exterior surface thereof, a member extending transversely of said elongated element having a reduced neck portion at one end and a ball secured to said reduced neck portion of a size to have a close fit within said socket, said ball being closely received within said socket for rotation and angular movement and said neck portion projecting from said socket, and a flexible, resilient, longitudinally split cylindrical sleeve embracing said one end of said element and having opposed marginal portions forming the edges of the longitudinal split, said edges being spaced apart a distance greater than the width of said neck portion to permit longitudinal movement of said sleeve relative to the assembled elongated element and transverse member without flexing, said edges at the midpoint in the length of said sleeve being spaced apart a distance less than the width of said socket and less than the diameter of said ball to overlap opposite sides of said socket and retain said ball therein, said edges of said sleeve flaring laterally outwardly to permit said ball to be inserted therethrough into said socket, said sleeve being in surfaceto-surface frictional contact with the smooth exterior surface at said one end of said elongated element to be held in position thereon, and said sleeve having a lengthwise dimension greater than its diameter to increase the area of frictional contact.

References Cited in the file of this patent

UNITED STATES PATENTS

| | | |
|---|---|---|
| 2,616,142 | Tinnerman | Nov. 4, 1952 |
| 2,854,266 | Dies | Sept. 30, 1958 |

FOREIGN PATENTS

| | | |
|---|---|---|
| 323,976 | Great Britain | Jan. 16, 1930 |
| 239,076 | France | Dec. 3, 1945 |
| 900,030 | France | Sept. 11, 1944 |
| 8,192 | Great Britain | 1914 |
| 949,255 | France | Feb. 14, 1949 |
| 738,300 | France | Oct. 11, 1932 |